June 29, 1965  A. L. WELCH  3,191,459
TRANSMISSION
Filed March 4, 1963
Fig-1-
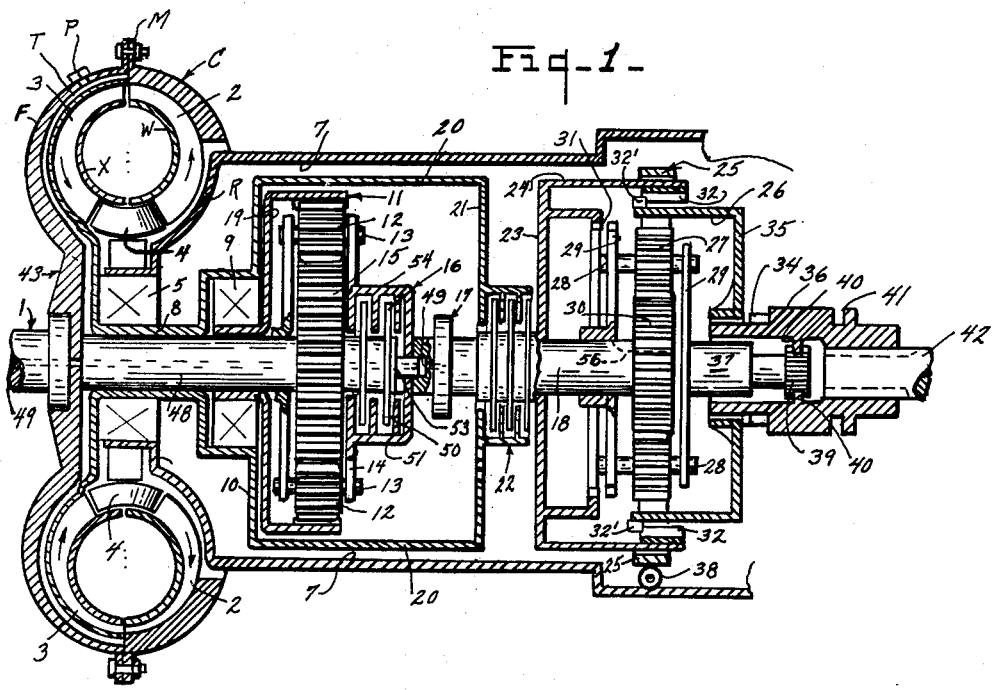
Fig-2-
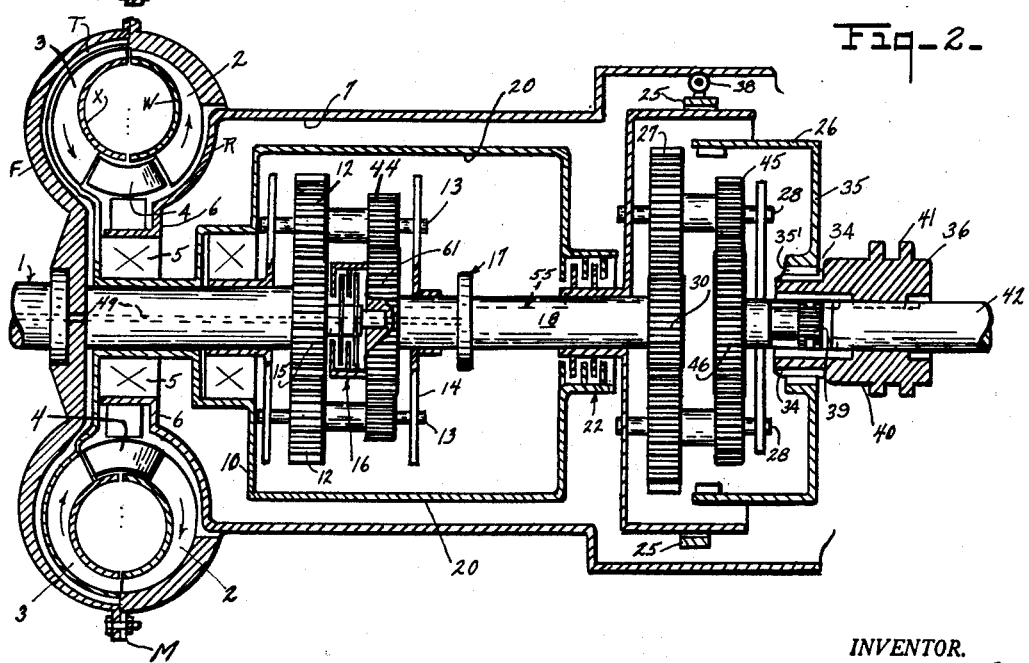
INVENTOR.
Arthur L. Welch.

United States Patent Office 3,191,459
Patented June 29, 1965

3,191,459
TRANSMISSION
Arthur L. Welch, P.O. Box 731, Wasilla, Alaska
Filed Mar. 4, 1963, Ser. No. 262,577
2 Claims. (Cl. 74—688)

This invention relates to an improvement in a transmission of the automatic type used in modern automobiles, consisting primarily of a hydraulic torque converter and two planetary gearsets. It is of the type known to the trade as a hydrodynamic and planetary split torque transmission.

Many modern automatic automobile transmissions employ a series of planetary gear-sets driven by a hydraulic torque converter. These gearsets are progressively shifted upward through the available ratios until direct drive is attained, with the torque converter smoothing out the steps in the ratio change. These transmissions are controlled by an elaborate hydraulic system of valves and clutches.

It is an object of this invention to provide a transmission of the fully automatic type employing gearsets of ratios considerably lower than any employed in contemporary transmissions, which will automatically progress from the lowest ratio through an infinite range of intermediate ratios to a one to one ratio, or direct drive. This transmission is of the full automatic type requiring no external controls or speed selecting devices.

Automatic transmissions are little known in heavier trucks, generally because of lack of desired efficiency, and because the present type transmissions do not lend themselves to the strong construction and lower ratios required. Further, the present vehicle will not stand the abuse required in the very powerful racing type automobiles presently being produced.

An object of this invention is to provide a mechanically simplified combined hydraulic and planetary gear transmission which smoothly delivers power to the load and at the most advantageous ratio that accounts for both the torque demand and the power input. This invention provides gear ratios much lower than the currently used seven to one ratio of direct drive truck transmissions. When engineered and constructed with ratios of five to one, this transmission will render performance for the above mentioned racing stock cars that is unheard of to-day.

The versatility of this new power transmission system will be readily appreciated by one skilled in the art.

Further objects and the details of construction and operation are revealed in the following description, reference being had to the accompanying drawings forming a part thereof, wherein like numerals refer to like parts throughout, and in which:

FIGURE 1 is a longitudinal sectional view of a combined hydraulic and planetary unit transmission exemplifying the invention.

FIGURE 2 is a longitudinal sectional view of same similar to FIG. 1 and illustrating a modification of transmission of this invention.

In the drawings, there is shown in FIG. 1 the time honored gear arrangement of planetary gear-sets using the sun-gears as input gears, the ring gears as reaction gears, and the pinion carrier assemblies as output members of the transmission. Further, there is shown in FIG. 2 the planetary gear-set arrangement embodying driving sun-gears, driven and driving pinion gears mounted in a carrier acting as reaction members, and driven sun-gears transmitting the transmission output.

As in all power transmissions employing gears to obtain a lower, or higher, output to input ratio, my transmission has an input or driven member, a reaction member that is held by some means, and an input member.

Further, since the transmission has two gear-sets, it can be seen that there are two each of the input, reaction and output members.

In FIG. 1, the sun gears 15 and 30 act as input members, the ring gears 11 and 26 are reaction members, and the pinion gears 12 and 27 rotate on the pins 13 and 28 combined with their carriers 14 and 29 to transmit the output of the gear-sets. In reverse operation, the reaction and output members of the second gear-set interchange, by means later to be described, with the carrier 29 becoming the reaction member, and the ring gear 26 becoming the output member.

In FIG. 2 the driving sun-gears act as driving members, the pinion gears 44 and 12 with their pins 13 and carrier 14 of the first gear set, and pinion gears 27 and 45 with pins 28 and carrier 29 of the second gear-set act as reaction members, with driven sun-gears 61 and 46 acting as output members.

The well known hydraulic torque converter is known as a hydrodynamic transmission to the trade. There are single stage of automotive and industrial types rendering a torque multiplication of up to about three times input torque. There are also three stage hydraulic torque converters differing from single stage mainly in turbine and reactor construction, and also torque multiplication, which can be as high as six to one.

It should be understood that while the drawing and description here presented deal with single stage automotive type torque converters, the industrial single stage and the three stage types are usable with the transmission of this invention, and it is the intent of the appended claims to cover said use.

The torque converters C shown by FIG. 1 and FIG. 2 are of the single stage, automatic type, embodying a case or housing 43 having a forward case F and a rear case R shaped to form a toroidal chamber T. Confronting flanges M are bolted together so that the forward and rear cases enclose chamber T. A filter hole is in one of the cases and has a removable filler plug P that can be removed for adding or draining oil from the transmission casing 43.

Power input shaft 1 can be driven by a motor or engine or can be the main shaft of a motor or the crankshaft of an engine. The casing 43 thereby transmits power from the prime mover shaft 1 to the impeller made of a plurality of circumferentially arranged blades 2 in chamber T and in an annular arrangement. Each blade is located in a plane slightly askew from radii passing through the transmission axis. Each blade 2 is arcuate along its inner edge when viewed from the side (FIG. 1) and the general appearance is of a crescent with the outer end slightly narrower than its inner end. An annular semi-toroidal wall W is fixed to the corresponding, arcuate inner edges of blades 2 thereby cooperating with the surface of rear case R and the blades 2 to form a group of circumferentially arranged open ended oil passages. The impeller with blades 2 is carried by casing 43 and rotates with the power input shaft 1.

The hydraulic section of the transmission has a turbine, or runner in toroidal chamber T. The runner is composed of a plurality of circumferentially spaced blades 3 that are fixed to a semi-toroidal back wall located in chamber T. Blades 3 are of the same shape as blades 2 and have their arcuate edges fixed to a semi-toroidal wall X that responds to wall W. Oil passages are formed by the blades and walls and runner. The runner has its blades askew from radii passed through the transmission axis, but the angularity is opposite to the angularity of blades 2. The semi-toroidal back wall is attached at its inner edge to cylindrical sleeve 8. As the liquid leaves the oil passages between the blades 3 it is directed by reactor which may be moved at various speeds or may be stopped depending on the load demands and the power input at shaft 1; further reference as to performance can be seen in Patent No. 2,869,398.

It is clearly seen that the turbine blades 3 are positioned to most efficiently absorb the power transmitted by the fluid. When the turbine with its blades 3 slows down under load, the fluid strikes the turbine blades 3 at a sharper angle, thus increasing the torque output of the blades 3. Considerable energy is dissipated as heat in this process, thus lowering the torque converter's overall efficiency, but the increase of torque described is a great virtue. When the fluid leaves the inner ends of the blades 3, at reduced speeds, it is traveling in a direction opposite the rotation of blades 2. The stator 4, or reactor has arcuately shaped blades axially positioned to receive oil escaping from the blades 3 and delivers the same oil to the inner openings of the impeller blades 2, thus completing the hydraulic circuit.

A one way brake 5, or free-wheel, which can take the form of rollers wedging between inclined planes on an inner race and a circular outer race, or of tiltable sprags wedging between circular inner and outer races in which cases the assembly is known as a sprag clutch 5, is installed between the stator 4 and the supporting flange 6 to prevent rearward rotation of said stator 4. When the turbine blades 3 reach about 85 percent of the speed of impeller blades 2, the stator 4 overrides the sprag clutch 5 and rotates with the impeller blades 2 and turbine blades 3 to form a simple fluid coupling with very nearly matched speed of impeller blades 2 and turbine blade 3, at nearly 100 percent efficiency.

It has been said that when the fluid in the hydraulic circuit of a torque converter circulates faster in a radial path than it circulates or is carried around the periphery of said circuit, that torque multiplication prevails. This hydraulic torque multiplication is very important to the operation of this transmission in this invention, as will be revealed later.

In the construction of my transmission, a suitable case 7 houses the torque converter and the first and second planetary gear-sets, all in coaxial alignment, and provides an anchor for the hydraulic servo unit 38, which embodies a cylindrical housing and a piston for exerting force against a brake band 25.

As related above, the two gear-sets each employ a driving member, a reaction member, and an output member.

In the first planetary gear-set, see FIG. 1, they take the form of the sun gear 15, driven directly from the prime mover output shaft 1 by the extension shaft 48, meshing with a plurality of pinion gears 12, which mesh with internal teeth in ring gear 11 and turn on the pins 13 which are securely mounted in holes equally spaced radially and circumferentially around and parallel to the axis of the pinion gear carrier 14. These pins impart rotation to the carrier 14 through the driving action of the sun gear 15 and the reaction of the ring gear 11 causing the pinions to advance in a circular path.

The first gear set is equipped with a first hydraulically operated multiple disc clutch 16, see FIG. 1, having an outer drum 54 incorporated into the pinion gear carrier 14. An inner hub 53 consisting of an extension of the sun gear drive shaft 48 and a plurality of friction discs 50 are interlaced and alternately keyed to the drum 54 and the hub 53. Said friction discs are locked immovably by oil under pressure from a source outside the transmission acting on a piston contained in operating position in the outer drum 54, not shown. The piston in the outer drum 54 is pushed back to released position by a spring, not shown, when the clutch 16 is not actuated, allowing the discs 50 freedom to move freely past each other, in radial manner. When locked or engaged the clutch 16 mechanism causes the first planetary gear-set members to rotate as a unit in direct drive. Clutch 16 and a second clutch 22, to be described later, are both controlled by a hydraulic governor 17; an oil passage 55 connects the governor 17 with clutches 16 and 22 effecting normal reactions.

The torque converter turbine blades 3, which might have a spline hub bore for manufacturing reasons, has a hollow shaft 18 forming an extension of the hub of said turbine, and provides means for housing the prime mover output extension shaft 48. This hollow shaft 8 drives the ring gear 11 thru the sprag clutch 9, similar to the sprag clutch 5 of the torque converter stator assembly described above, and the ring gear supporting flange 19. A radially extending flange 10 driven by the sprag clutch 9 cage, further drives a drum 20 carried by said flange 10 periphery. This drum 20 embodies an inward extending flange 21 attached to the outer drum of the second hydraulically operated multiple disc clutch 22, similar in construction and operation to the clutch 16 described above. This second clutch 22 has a reaction flange 23 keyed to the said clutch 22 hub transmitting turbine power to the second planetary gear set yet to be described.

The first gear unit being drivably connected to the second gear-set by the second clutch 22 and the drum 20, is further connected by the first pinion carrier 14 by driven shaft 18 carrying the second sun gear 30 on splines 56 on the after end of shaft 18. This shaft 18 therefore transmits the mechanical power output of the first gearset to the second gearset.

In this second gearset, which is similar to the first gearset except for being of stronger construction and that it slides forwardly and rearwardly on splines 56, the sun gear 30 acts as the driven member; the pinion gears 27 transmit output by reacting against the ring gear 26 and rotating on their pins 28, which impart rotation to the carrier 29 and the attached output shaft 37. This output shaft 37 has uninterrupted spline teeth 39 on the after end connectable to a coupling 36 for forward rotation. This coupling 36 has spline teeth 40 always engaged with splines on the driven device shaft 42 receiving the combined output of both first and second gearsets.

In forward operation the ring gear 26 acts as reaction member. Ring gear 26 also has spline teeth on the outer circumference engaging mating teeth 32 in the annular bore of a brake drum 24 drivably attached to the periphery of the reaction flange 23 mentioned above. The outer surface of this brake drum 24 is clutched by the brake band 25 constricted by the above mentioned servo unit 38. Since the servo unit is supported by the transmission case 7 it can be seen that the ring gear 26 will be held from rearward rotation when the transmission is started turning by the admission of oil under pressure from a source outside the transmission to said servo unit 38, thus supplying mechanical reaction to the whole transmission.

This initial operation wherein the power output of the first gearset is mechanically amplified by the gear reduction of the second gearset is a very important feature of my transmission. The further feature of acceleration from maximum reduction in starting position to direct drive through an infinite range of gear ratios is explained below.

In this initial acceleration, part of the prime mover's power is transmitted mechanically to the sun gear 15 and part hydraulically by the torque by the converter turbine blades 3 driving the ring gear 11 thru the sprag clutch 9. Since torque converters require torque input at a rate that squares as speed increases, any appreciable speed increase of the prime mover will cause the turbine blades 3 to transmit more torque to the ring gear 11, thus overcoming the reaction resistance of the first gearset and increasing the rotation speed of said ring gear 11. As the turbine blades 3 increase in speed, the hydraulic torque multiplication ratio of the torque converter drops; but also as the ring gear 11 speed is increased by said turbine blades 3, the mechanical reduction ratio of the planetary gearset drops, at a rate very closely matching the hydraulic multiplication ratio drop. It can thereby be seen that if the prime mover accelerates enough direct drive will be achieved in the first gearset, having progressed from maximum reduction through an infinite range of ratios to direct drive.

At some predetermined point near a one to one ratio in the first gearset, oil under pressure from a source outside the transmission is admitted to the clutches 16 and 22 by the centrifugally actuated hydraulic governor valve 17. At the same time and by the same governor valve 17 the oil supply to the servo unit 38 is cut off, releasing the band 25, and therefore the brake drum 24 and the reaction flange 23. The first clutch 16 locks the sun gear 15 to the carrier 14, creating a mechanical direct drive in the first gearset and over-riding the sprag clutch 9. The second clutch 22 locks the turbine driven drum 20 and flange 21 to the reaction flange 29, thereby transmitting turbine blades 3 power to the second ring gear 26 by means of teeth 32 in the bore of the brake drum 24 clutching mating teeth 32 on the ring gear 26 outer surface. Under normal conditions where the load can continue to the accelerated, the second ring gearset will also be advanced through an infinite range of ratios to direct drive. The second gear set will still remain responsive to overloads by replying with reduced ratios, yet will always strive for the highest possible output speed. At high prime mover speeds and light loads the hydraulic circuit of the torque converter will act as a simple fluid coupling with the impeller 2, the turbine 3, and stator 4 rotating at substantially the same speed.

In reverse operation, the coupling 36 is shifted forwardly by means connected with the shifter collar 36 clearly described later in this specification. Shaft 37 has splines 39 mating with like splines in the forward bore of the coupling 36. These splines 39 are matingly interrupted both on the shaft 37 and in the coupling 36 to allow free rotation when the coupling 36 is moved forward. This forward motion of coupling 36 also engages short spline teeth on the forward outer surface of the coupling 36 with mating splines in the bore of a flange 35 carrying the ring gear 26 on the periphery of said flange 35. Shifting the coupling 36 and therefore the ring gear 26 further forward releases the teeth 32' on the surface of the ring gear 26 from like teeth 32 in the bore of the brake drum 24, and engages the mating teeth 31 on the pinion carrier 29 periphery and on the inner wall of the reaction flange 23, thus changing the ring gear 26 from reaction member to output member, and the pinion carrier 29 from output member to reaction member. The first planetary gearset transmits its output through the sun gear 30 as in forward operation, and is prevented from shifting to direct drive by shutting off the oil supply to the hydraulic governor valve 17. The transmission is again started by admitting oil water pressure to the hydraulic servo unit 38.

It is clearly seen from the above that in reverse operation, the coupling 36 pushes the whole second gear-set forward. Teeth 39 are disengaged, teeth 32 are disengaged and the teeth 31 are engaged, changing reaction members from a ring gear 26 to carrier 29, and driven members are changed from carrier 29 to ring gear 26. The gears of the gear-set remain in engagement. Sun gear 30 slides on the splines 56, embodied in shaft 18.

FIGURE 1 shows the time honored gear arrangement of planetary gear-sets using the sun gears as input gears, the ring gears as reaction gears, and the pinion gear carrier assemblies as output members of the transmission.

In FIGURE 2, the planetary gear-set arrangement of the longitudinal sliding driving sun gears, driven and driving pinion gears mounted in a carrier acting as reaction members, and driven sun gears transmitting the transmission output.

In FIGURE 2, similar numerals are added to like parts and operation thereof appear clear to those in the art without added description. However, in FIG. 2 reverse operation is accomplished by the coupling 36 of similar construction to coupling 36 in FIG. 1 except that the ring gear driven flange 35 is always engaged to the coupling 36 by the splines 35' with 34, being shifted forward until the splines 39 are free, and until the ring gear 26 meshes with the driven pinion gears 27. The pinion carrier 29 remains the reaction member, the output member ring gear 26 being an important part of this gear arrangement. Therefore, it is seen that FIG. 2 illustrates a modification including a driving shaft 1 connected to the impeller of a torque converter and to a sun-gear 15 in mesh with pinion gears 44 and 12 with their pins 13 and carrier 14 of the first gear-set, and pinion gears 27 and 45 with pins 28 and carrier 29 of the second gearset acting as reaction members with sun-gears 61 and 46 as output members.

Since it is well within the scope of one with ordinary skills in the art to interchange the various gear units shown in FIGURES 1 and 2 thus forming in effect a plurality of transmissions, I have included claims covering only the transmissions illustrated and not all the possible combinations thereof.

It should be understood, however, that it is the intent of the appended claims to cover all possible combinations, and, if the examiner deems it necessary, such further claims will be submitted.

What I claim is:

1. A hydrodynamic and planetary split torque transmission comprising coaxially aligned, spaced driving and driven shafts, a first extension shaft rigidly connected with and rotatable with the driving shaft and extending rearwardly therefrom, a hydraulic torque converter embodying a housing, an impeller, a driven turbine; said impeller connected with said driving shaft and rotatable therewith, a pair of planetary gear units; the first planetary gear unit having a sun gear mounted upon and secured to the rear end of said first extension shaft, said sun gear having a hub portion extending rearwardly therefrom, a plurality of pinion gears forming reaction members rotatably mounted on pins, said pins fixed to a first pinion gear carrier rotatably mounted on said first extension shaft and forming an output member, a hydramatically operated multiple disc clutch mounted on the hub portion of said sun gear embodying friction discs interlaced with friction plates found inside a clutch drum connected with said pinion gear carrier and adapted to lock said pinion gear carrier and said sun gear together when actuated, a ring gear supported upon said first extension shaft and having internal teeth meshing with said pinion gears, a hollow shaft connected with said turbine and surrounding a portion of said first extension shaft, a one way clutch drivingly connecting said hollow shaft and said ring gear, a drum enclosing said first planetary gear unit and connected with said hollow shaft, a second planetary gear unit comprising a plurality of elements, a second disc clutch connecting said drum to one of said elements, said second planetary unit having a second sun gear element mounted upon and secured to the rear end of a sun gear supporting shaft drivingly connected with said first pinion gear carrier, a second plurality of pinion gear elements rotatably mounted on pins fixed to a sceond pinion gear carrier rotatably mounted upon said second sun gear supporting shaft, a brake drum extending over said second planetary gear unit and connected with a vertical flange portion of said second disc clutch, a second ring gear element arranged between said brake drum and said second plurality of pinion gears and having external teeth mating with internal teeth of said brake drum, said second ring gear having internal teeth mating with said second plurality of pinion gears, said second pinion gear carrier attached to an output shaft having spline teeth on the rear end thereof connectable to a coupling slidably mounted upon splines on the said driven shaft receiving the combined output of both said first and second planetary gear units.

2. A hydrodynamic and planetary split torque transmission comprising the combination of a prime mover driven output shaft driving a hydraulic torque converter having a housing, impeller, turbine, and reactor means; a first extension shaft connected with the said prime mover driven output shaft and extending rearwardly therefrom, a first planetary gear set having a first sun gear connected with and driven by the said first extension shaft connected with the said prime mover driven output shaft, said first sun gear meshing with a plurality of pinion gears rotatably mounted on pins fixed to a first pinion gear carrier having an axially formed drumlike bore housing, a first hydraulically operated multiple disc clutch mounted on and connected with a hub-like extension of said first sun gear extending rearwardly therefrom, said first disc clutch locking said first pinion gear carrier and said first sun gear together when actuated, a ring gear having internal teeth meshing with said pinion gears, a hollow shaft connected to said turbine and surrounding the extension of said prime mover output shaft, a one way clutch drivingly connecting said hollow shaft and said ring gear, a drum enclosing said first planetary gear set and connected with said hollow shaft, a second planetary gear set comprising a plurality of elements, a second disc clutch connecting said drum to one of said elements, said second planetary unit having a second sun gear element mounted upon and secured to the rear end of a sun gear supporting shaft drivingly connected with said first pinion gear carrier, a second plurality of pinion gear elements rotatably mounted on pins fixed to a second pinion gear carrier rotatably mounted upon said second sun gear supporting shaft, a brake drum extending over said second planetary gear unit and connected with a vertical flange portion of said second disc clutch, a second ring gear element arranged between said brake drum and said second plurality of pinion gear elements and having external teeth mating with internal teeth of said brake drum, said second ring gear element having internal teeth mating with said second plurality of pinion gear elements, said second pinion gear carrier attached to an out-put shaft having spline external teeth on the rear end thereof connectable to internal teeth of a coupling slidably mounted upon splines extending upwardly from the said driven shaft thereby receiving the combined output of both said first and second planetary gear units, the said brake drum being surrounded by a brake band constricted by a hydraulic servo unit anchored to a transmission case coaxially housing the torque converter and said first and second gear sets, and a reverse mechanism comprising external teeth upon said coupling engageable with mating teeth in the bore of the outward radiating flange drivably carrying said ring gear on said flange periphery, with teeth connected with the rearward wall of said brake drum vertical wall portion clutching teeth on the periphery of the second pinion gear carrier adjacent flange.

References Cited by the Examiner

UNITED STATES PATENTS

| | | | |
|---|---|---|---|
| 2,146,369 | 2/39 | Dodge | 74—688 |
| 2,196,660 | 4/40 | Dodge | 74—688 |
| 2,588,220 | 3/52 | Duffield | 74—688 |
| 2,627,764 | 2/53 | Mayner | 74—688 |

FOREIGN PATENTS 1,222,696   1/60   France.

DON A. WAITE, *Primary Examiner.*